Figure 1:
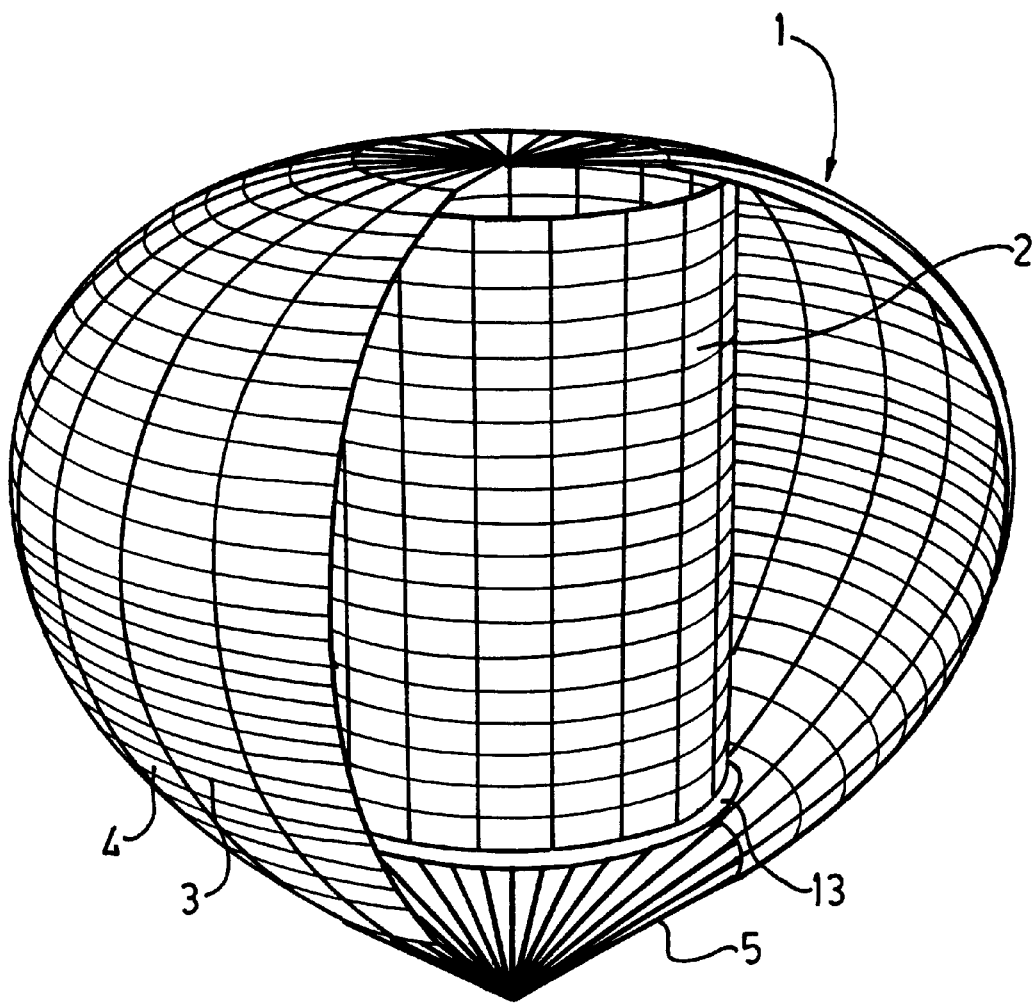

United States Patent [19]
Tockert

[11] Patent Number: 5,992,795
[45] Date of Patent: Nov. 30, 1999

[54] STRATOSPHERIC BALLOON WITH LONG FLIGHT DURATION

[75] Inventor: Christian Tockert, Toulouse, France

[73] Assignee: Centre National d'Etudes Spatiales, Paris Cedex, France

[21] Appl. No.: 09/171,624

[22] PCT Filed: Apr. 25, 1997

[86] PCT No.: PCT/FR97/00745

§ 371 Date: Oct. 23, 1998

§ 102(e) Date: Oct. 23, 1998

[87] PCT Pub. No.: WO97/39944

PCT Pub. Date: Oct. 30, 1997

[30]   Foreign Application Priority Data

Apr. 25, 1996 [FR]   France ................................. 96 05391

[51] Int. Cl.⁶ ................................ B64B 1/40; B64B 1/58
[52] U.S. Cl. ............................................ 244/31; 244/128
[58] Field of Search ................................ 244/31, 96, 97, 244/128

[56]   References Cited

U.S. PATENT DOCUMENTS

| | | | |
|---|---|---|---|
| 2,771,256 | 11/1956 | Ryan | 244/31 |
| 3,220,671 | 11/1965 | Ashman et al. | 244/31 |
| 3,312,427 | 4/1967 | Yost . | |
| 3,337,162 | 8/1967 | Bauserman | 244/31 |
| 3,565,368 | 2/1971 | Byron . | |
| 4,262,864 | 4/1981 | Eshoo . | |
| 4,361,297 | 11/1982 | Pommereau et al. | 244/31 |
| 4,865,266 | 9/1989 | George . | |
| 5,076,513 | 12/1991 | Regipa et al. | 244/31 |
| 5,104,059 | 4/1992 | Rand et al. | 244/31 |
| 5,115,997 | 5/1992 | Peterson | 244/31 |

FOREIGN PATENT DOCUMENTS

| | | |
|---|---|---|
| 0 321 012 | 6/1989 | European Pat. Off. . |
| 0 524 872 | 1/1993 | European Pat. Off. . |
| 2 418 150 | 9/1979 | France . |
| 2 639 607 | 6/1990 | France . |

*Primary Examiner*—Michael J. Carone
*Assistant Examiner*—Charles R. Ducker, Jr.
*Attorney, Agent, or Firm*—Young & Thompson

[57]   ABSTRACT

A stratospheric balloon comprising on the one hand an external flexible envelope (1) having a natural shape and made of transparent synthetic material and presenting an air inlet and, on the other hand, an internal screen (2) made of visible and infrared energy collecting material and having the shape of a surface generated by a mobile generatrix parallel to the longitudinal symmetry axis of the external envelope. The internal shield is connected to the envelope (1) by attachments arranged at the upper part of the envelope at a distance from the longitudinal axis of the latter, and extending longitudinally freely inside the envelope (1) without contacting it.

7 Claims, 8 Drawing Sheets

STRATOSPHERIC BALLOON WITH LONG FLIGHT DURATION

The invention concerns a stratospheric balloon with long flight duration of the type having an envelope made of transparent material able to present a state of fullness where said envelope is entirely inflated. "Transparent material" is normally understood to mean a material which allows solar and infrared radiation to pass with very minor absorption in relation to the incident flux. This material may in particular consist of polyethylene or polyester which are the materials generally used to manufacture stratospheric balloons.

It is known that variable volume conventional stratospheric balloons may have very large volumes (greater than $10^6$ m$^3$) and can transport heavy loads to altitudes of the order of 40 to 45 km. These stratospheric balloons are characterized in particular in that they operate with a gas which is lighter than air from which they draw their lifting force and in that their volume in the full state is very much greater than their volume in the bubble state. This type of balloon may for example be illustrated by patent U.S. Pat. No. 3,312,427. These stratospheric balloons are totally different from hot air balloons which are constant volume balloons, using atmospheric gas in which they are immersed and drawing their lifting force, either from a burner, or from the ambient radiation (solar or infrared). Solar or infrared hot air balloons are made so as to collect continuously the maximum solar or infrared energy, and to this end, are provided over at least a half of their surface area with a device for trapping solar or infrared radiation. Hot air balloons may for example be illustrated by the patents FR 2.418.150 or U.S. Pat. No. 4,262,864.

The essential problem which variable volume stratospheric balloons present lies in their very short life span, of the order of 24 hours, which may be extended to several days on condition that large quantities of ballast are carried. In point of fact, during the daytime, when a stratospheric balloon arrives at the full state, part of the gas is expelled until the free lifting force is cancelled, the balloon thus becoming stabilized at its flight platform. At night, the gases of the balloon undergo a high degree of cooling which brings about a considerable reduction in the volume thereof and causes the balloon to descend irreversibly. Only jettisoning ballast will then enable this to be stabilized (of the order of 10% of the total weight). However, the lifting force which is thus added is retrieved on the following day and results in a new expulsion of gas at the ceiling so that the operation of jettisoning ballast is renewed each night in order to prevent an irreversible descent. Since the quantities of ballast carried are limited, the lifespan of such balloons cannot generally exceed 4 to 5 days. This limitation to the lifespan is a serious fault in this type of balloon while the necessity of carrying ballast in a large quantity is very penalizing since it necessitates an increase in the volume of the balloon and the mass of aerostatic gas for a given pay load and, consequently, leads to an increase in the cost of the flight.

In order to overcome this disadvantage, a variable volume stratospheric balloon has been designed, such as described in patent FR 2.639.607, having a thermal trapping cover fixed to the upper part of the envelope. As explained in this patent, such a trapping cover, in point of fact, enables the balloon to be stabilized between upper levels (daytime periods) and lower levels (night-time periods) over a plurality of day and night cycles. However, as with all conventional stratospheric balloons, such a balloon is confronted with problems of diffusion of the aerostatic gas, which leads to a limitation of its flight duration.

The present invention aims to overcome the above mentioned disadvantages of current stratospheric balloons and essentially aims at providing a stratospheric balloon having a long flight duration without requiring the jettisoning of ballast.

Another objective of the invention is to provide a stratospheric balloon capable of carrying high pay loads, and the cost of which differs very little from that of a conventional open stratospheric balloon.

To this end, the invention concerns a stratospheric balloon comprising:
- an outer flexible envelope having a natural shape, namely with iso-stress, made of transparent synthetic material and having an air inlet opening capable of enabling the balloon to be kept at constant volume,
- an internal screen made of visible and infrared energy collecting material, and having the shape of a surface produced by a mobile generatrix parallel to the longitudinal axis of symmetry of the external envelope, said internal screen being connected to the envelope by means of attachment disposed at the upper part of said envelope at a distance from the longitudinal axis of the latter, so as to extend longitudinally freely inside the envelope without contacting it.

The invention thus consists of producing a stratospheric balloon which incorporates first of all an inner screen constituting a heating body acting as a solar and infrared energy collector which provides, either side of said screen, double convection inside the envelope, and the high temperature of which leads to considerable reheating of the aerostatic gas which results in an appreciable improvement in the buoyancy of the balloon compared with that of conventional stratospheric balloons. In addition, on account of the shape and arrangement of this internal screen inside the envelope, an identical distribution is obtained at night of the visual factors between the background of the sky and the ground, and the internal screen is therefore maintained at a sufficiently high temperature to obtain, by convection, a temperature of the gas enclosed within the envelope, which is able to ensure stabilization of the balloon.

Moreover, such a balloon possesses a large size throat enabling large masses of air to be scooped in when the balloon, which has arrived at its ceiling, starts its descent and enables said balloon to be stabilized, taking into account the large volume of air enclosed, with a very small temperature difference between the internal gas and the external air (of the order of 2 to 3 degrees). On account of this, this balloon is of the constant volume and variable mass type and is in addition not sensitive to leaks. In addition, on account of the fact that the balloon is filled progressively with air while losing altitude during the night, it loses altitude in an asymptotic manner during the first few days until it arrives at an equilibrium altitude.

As simulations have shown, such a balloon may have flight durations of the order of two to three months in polar regions with a cruising altitude of 30 km, and without the necessity for jettisoning ballast.

In addition, such a balloon may carry large pay loads. As an example, a balloon according to the invention having a volume of 400 000 m$^3$ may carry a pay load of 500 kg. It should moreover be noted that the cost of such a balloon corresponds to that of a conventional hot air balloon of 36 000 m$^3$ which can only carry a pay load of 80 kg.

It should be noted that patents U.S. Pat. No. 4,865,266 and EP-524 872 describe hot air balloons provided with an internal solar energy collecting element.

However, and first of all, such hot air balloons consist of machines of a totally different type from the balloon according to the invention, which draw their lifting force either from a burner (U.S. Pat. No. 4 865 266) or from the quantity of heat produced by the condensation of steam (EP-524 872).

Moreover, the internal elements equipping these hot air balloons differ totally in their structure or their positioning from that which is the aim of the invention a diaphragm forming a false ceiling under the upper pole of the hot air balloon for patent U.S. Pat. No. 4,865,266 and a frustoconical-shaped fabric covering of which the upper edge is attached to the equatorial region of the envelope, for patent EP-524 872.

In addition, these hot air balloons do not include any other elements which are characteristic of the invention and which, in combination with the structure and positioning of the internal screen, lead to advantageous results being obtained producing the stratospheric balloon which is the subject of the present application.

Such hot air balloons consist in fact of machines which operate strictly on a daytime basis and which have a totally different nature from that of the invention and are the seat of totally different thermal mechanisms.

According to another feature of the invention, the flexible outer envelope consists of gores assembled longitudinally by means of tensioning tapes attached to the edges of these gores, said gores being interrupted at a distance from the lower pole of the envelope so as to form the air inlet, and said tapes extending into the extension of said lower pole and being connected at the lower part to means for attaching a load.

According to another feature of the invention, the internal screen has a ballasted lower end able to ensure that the shape of said screen is maintained.

Moreover, the means of attachment are preferably disposed at a distance from the longitudinal axis of the envelope adapted so that said means of attachment are situated down wind from the cast off point when the balloon is launched. Thus, this screen and the means of attachment are situated astern during the launch and are therefore not subjected to any mechanical stress.

According to another feature of the invention, the means of attachment consist of tapes interposed between the edges of two gores when the latter are assembled, so that said tapes are caused to float inside the envelope after said gores are deployed, and means of attachment of the internal screen to each of the tapes. This solution enables the entire envelope to be produced by means of a duly proven conventional technology, by simply incorporating a supplementary tape between the gores before welding the edges of the latter.

Moreover, the internal screen preferably consists of a cylindrical envelope open at each of its ends. In point of fact, this cylindrical shape leads to a high absorption yield and to uniform heating whatever the position of the sun.

In addition, when the balloon is launched, this cylindrical envelope is advantageously kept stretched over its largest length by means of throttle valves with remote controlled or automatic opening. This arrangement in point of fact makes it possible to prevent too great a rate of ascent and too high an excess pressure when the balloon is full in relation to the flow rate from the discharge opening.

Figure 2:
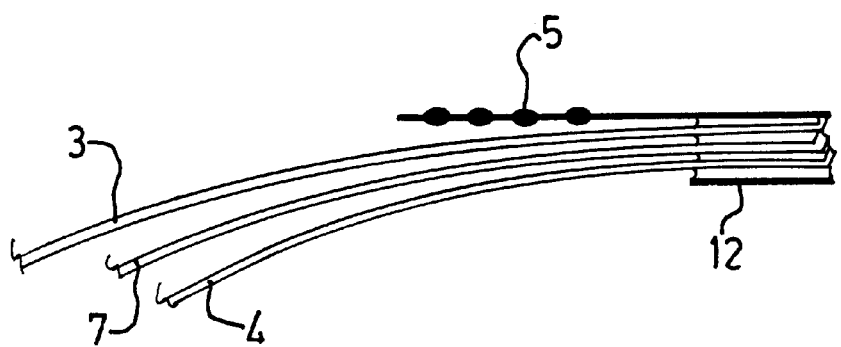
Figure 3:
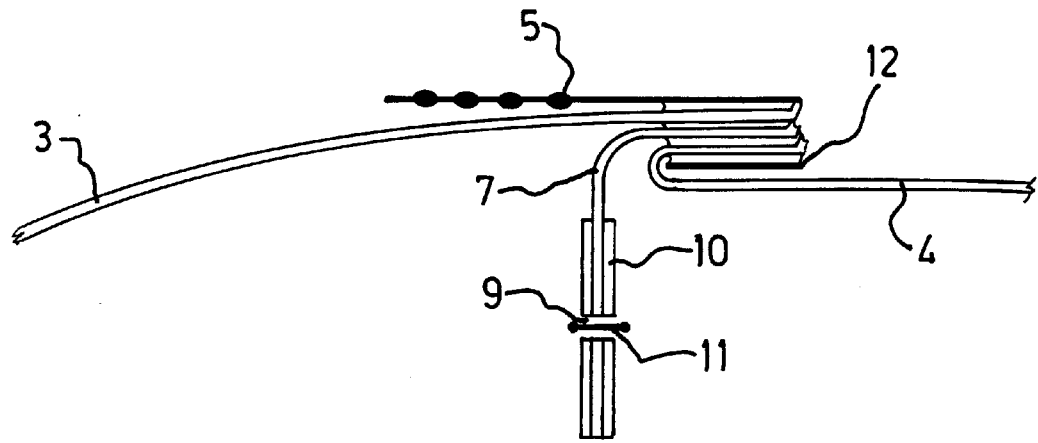
Figure 4:
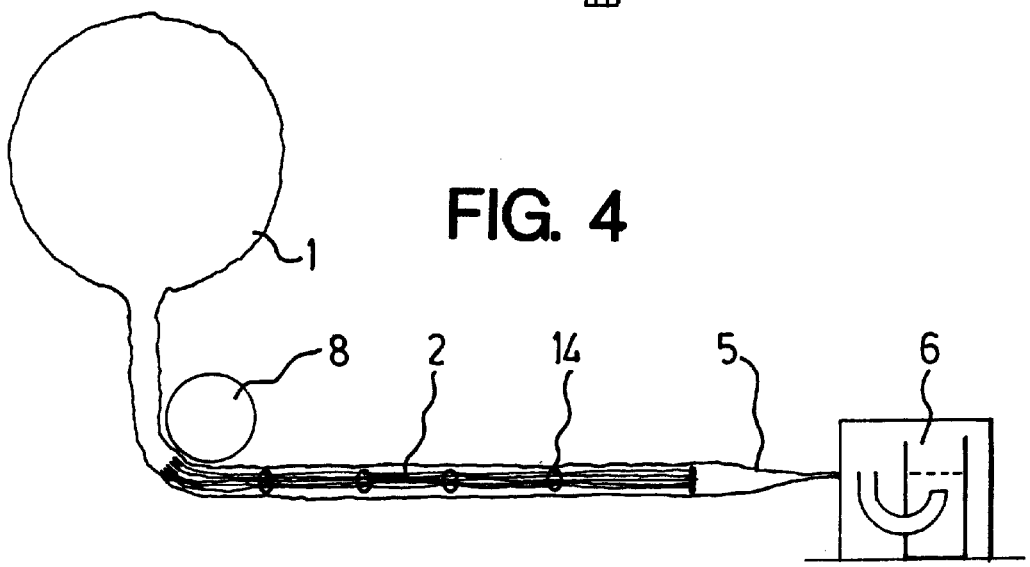
Figure 5:
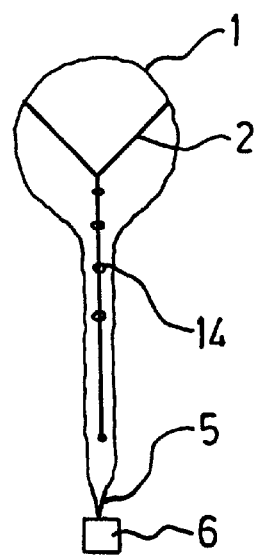
Figure 6:
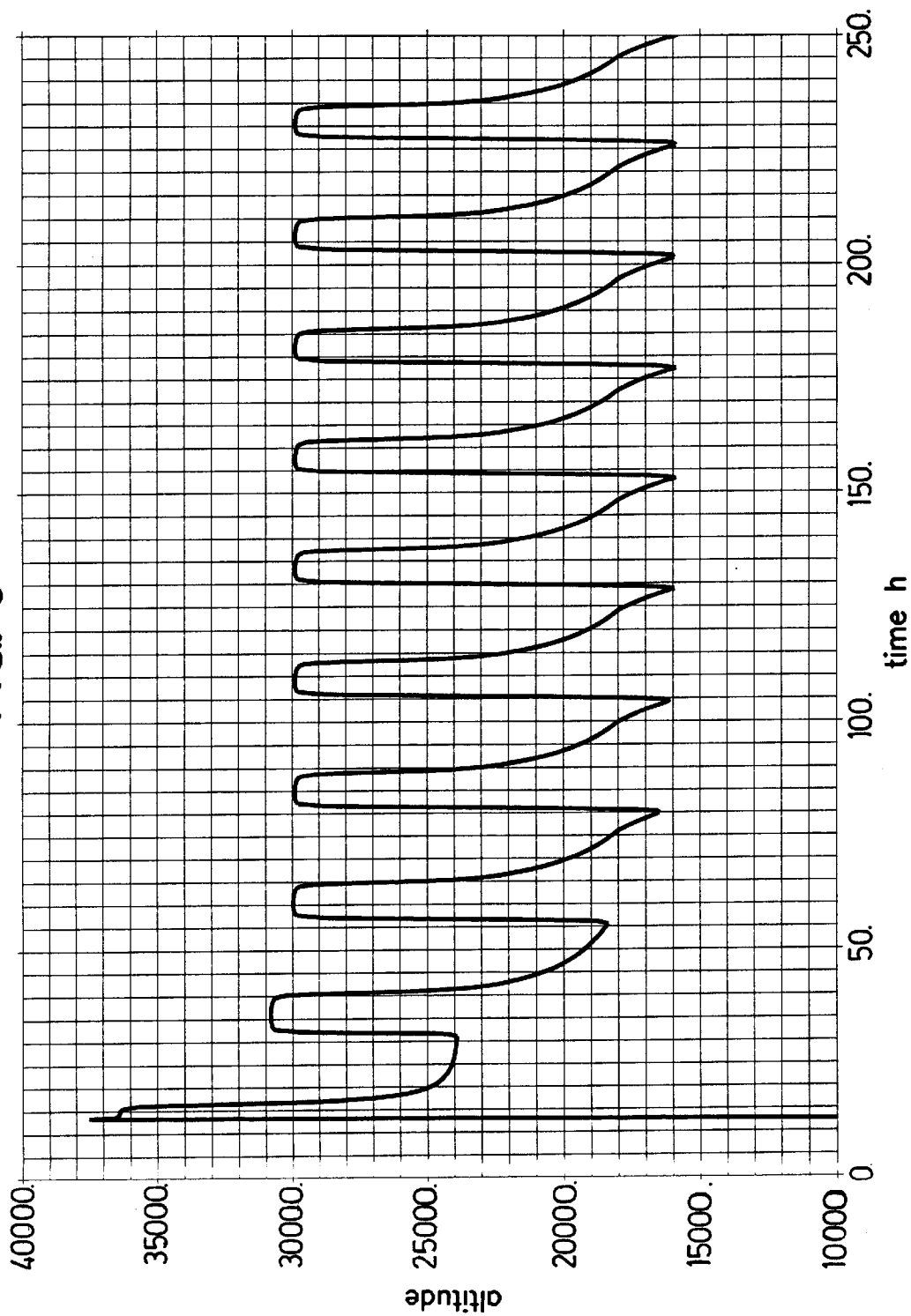
Figure 7:
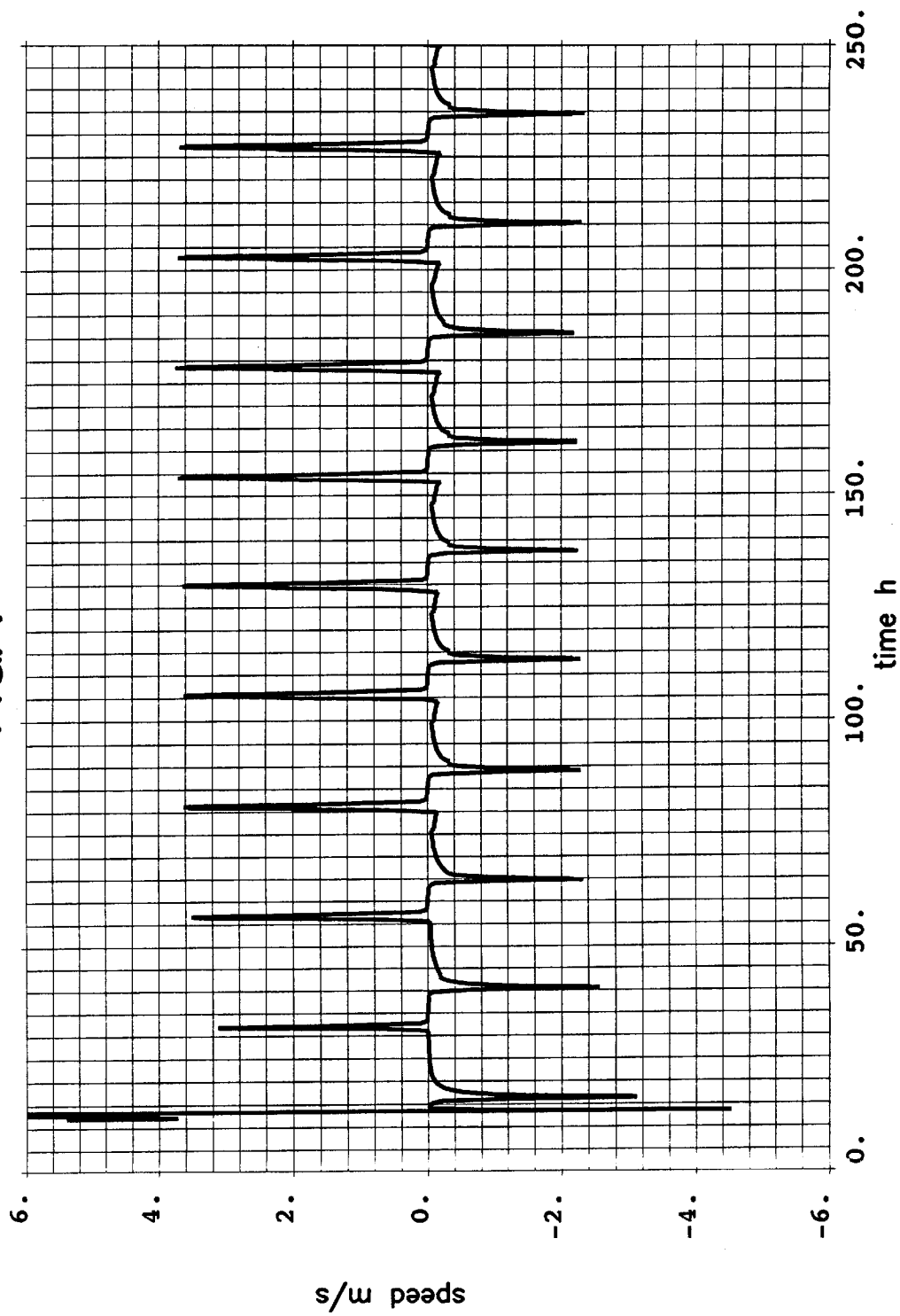
Figure 8:
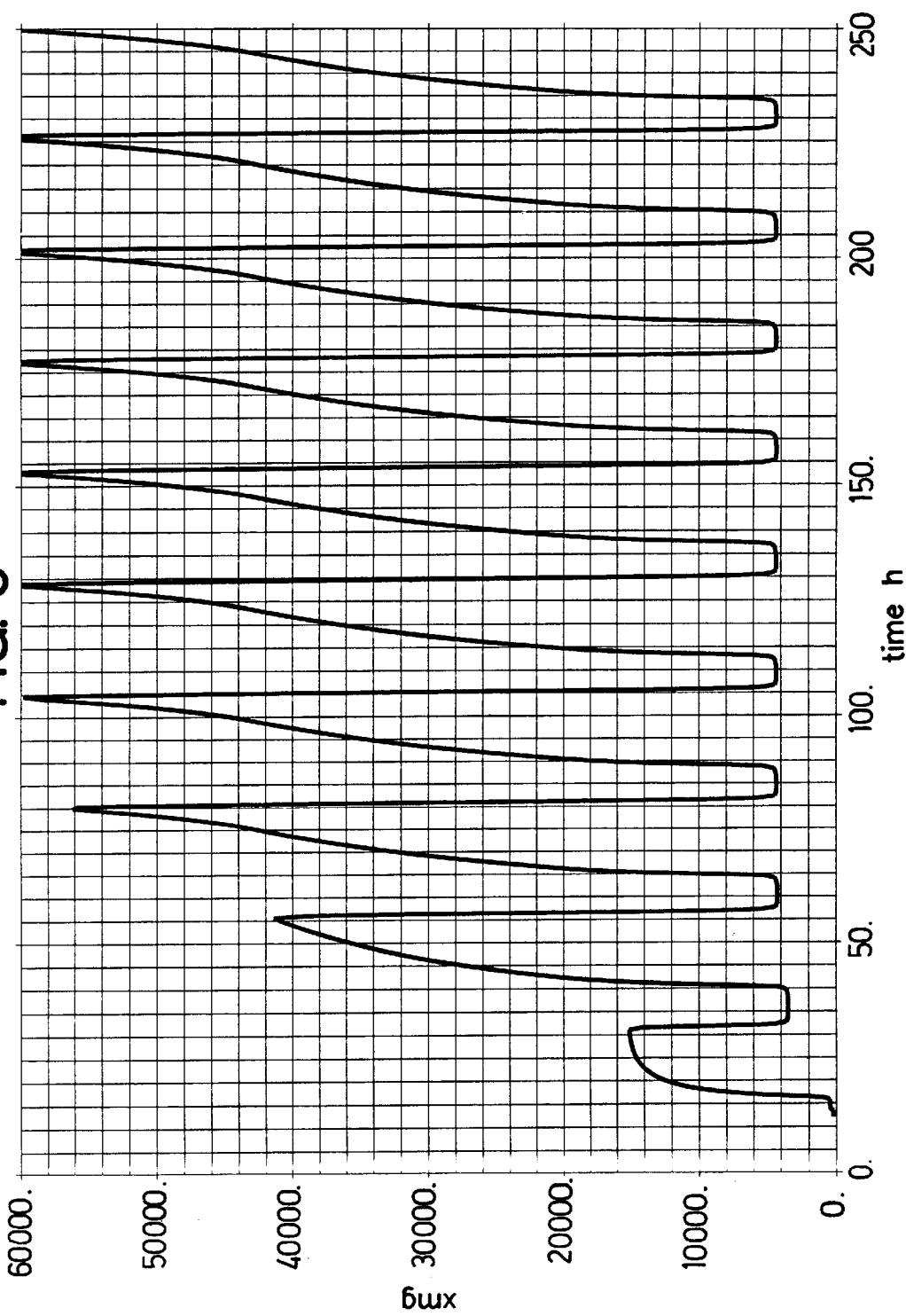
Figure 9:
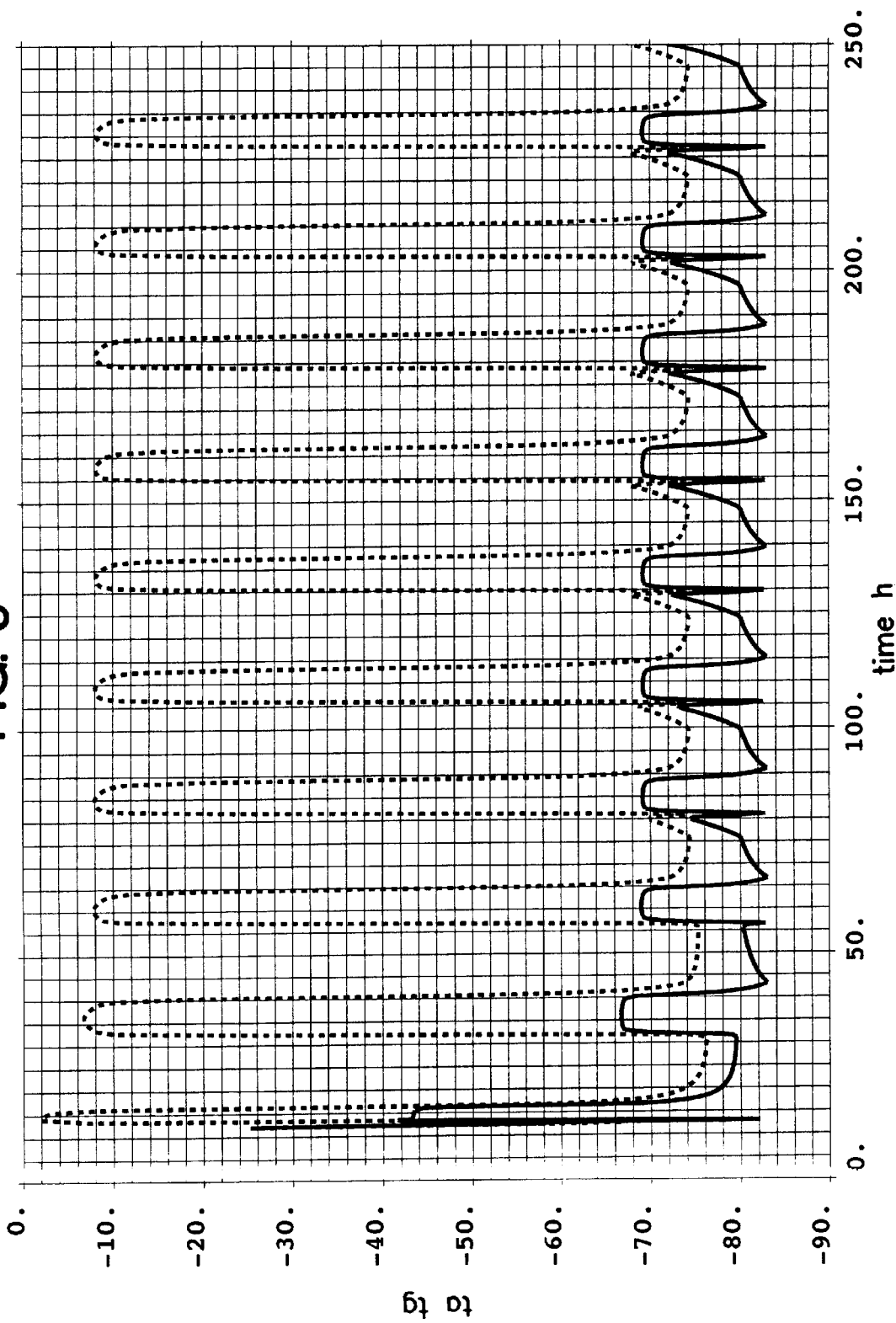
Figure 10:
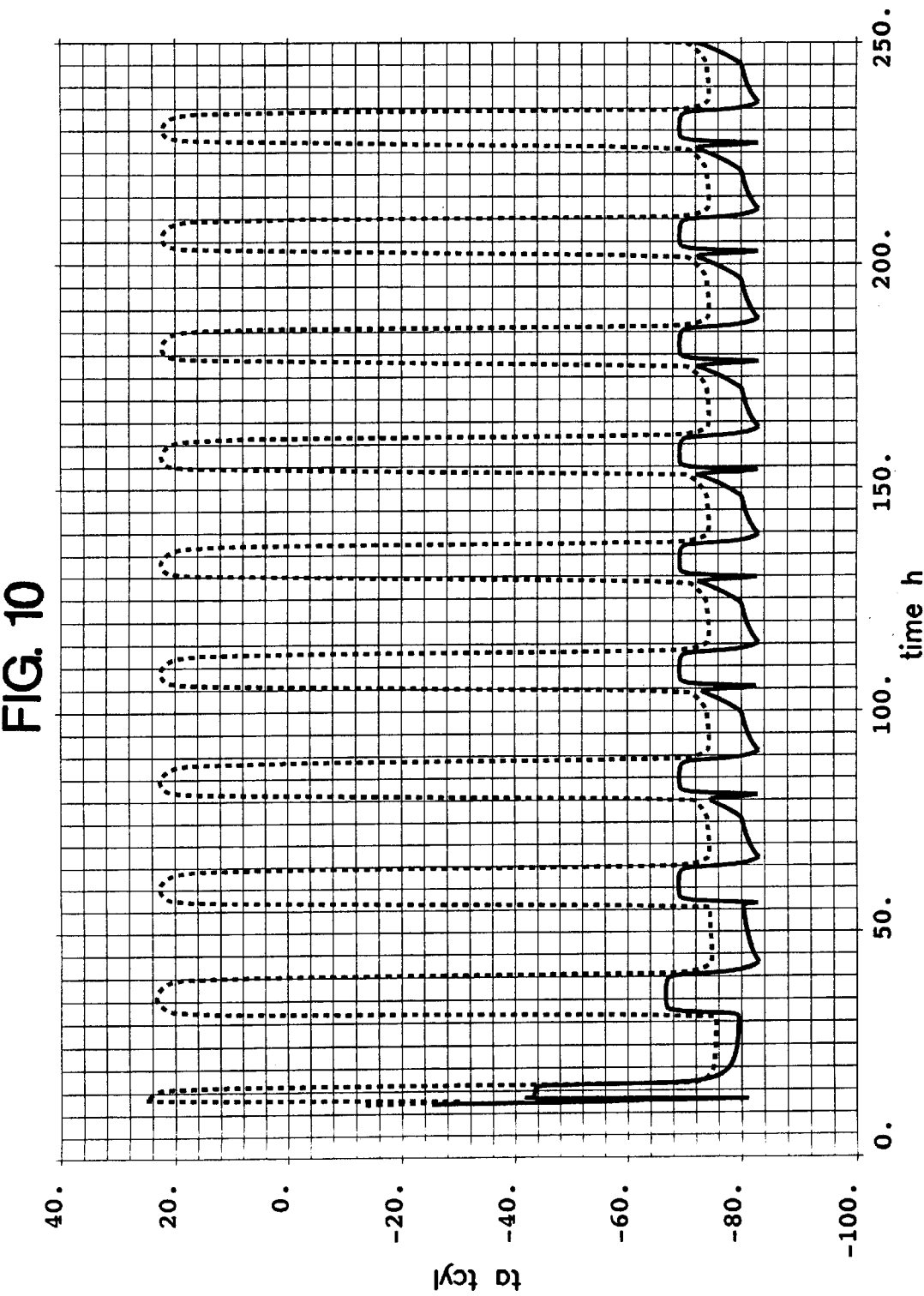
Figure 11:
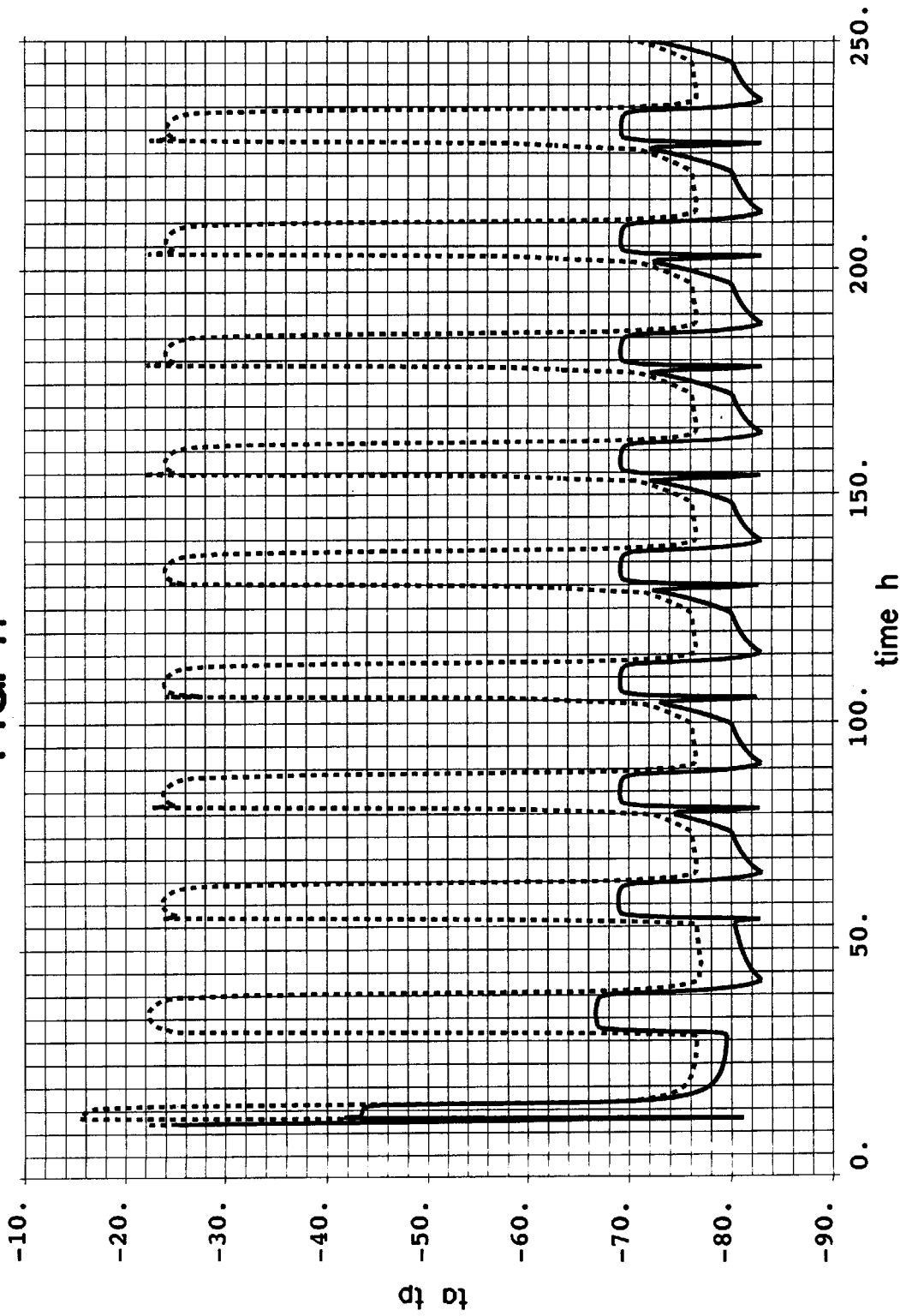

Other features, objectives and advantages of the invention will become apparent from the following detailed description with reference to the accompanying drawings which show a preferred embodiment by way of a non-limiting example. In these drawings, which form an integral part of the present description:

FIG. 1 is a perspective view of a stratospheric balloon according to the invention, FIG. 2 is a view representing two gores when these are assembled, FIG. 3 is a view of these two gores after they are assembled and deployed, FIG. 4 is a diagram showing the balloon as it is launched, FIG. 5 is a diagram showing this balloon in the ascent phase, FIG. 6 is a graph illustrating changes in this balloon with time, FIG. 7 is a graph showing changes with time of the rate of ascent and descent of this balloon, FIG. 8 is a graph showing fluctuations with time of the mass of gas enclosed inside this balloon, FIG. 9 is a graph showing variations with time of the temperature of the gas enclosed inside this balloon (represented by dotted lines) and variations of the temperature of the ambient air (in solid lines), FIG. 10 is a graph showing variations with time of the temperature of the internal screen (in dotted lines) and variations in the temperature of the ambient air (in solid lines), and FIG. 11 is a graph showing variations with time of the temperature of the envelope (in dotted lines) and variations of the temperature of the ambient air (in solid lines).

The stratospheric balloon shown in FIG. 1 is a balloon with a heating body consisting of an envelope 1 having a natural shape containing a cylindrical envelope 2 acting as a solar and infrared energy collector.

First of all, the envelope 1 is constructed from gores such as 3, 4 in a transparent material such as polyethylene or polyester, having absorption coefficients of the order of 3% in the visible, and 20% in the infrared regions, assembled longitudinally by means of tensioning tapes 5 welded to the edges of said gores.

In addition, these gores 3, 4 are interrupted at a distance from their lower ends by tensioning tapes 5, so that the envelope has a large size air inlet. As regards these tensioning tapes, they are conventionally connected at the lower part to means for attaching the load 6 to be carried.

This envelope additionally includes tapes such as 7 interposed between the gores 3, 4 and disposed at a distance from the upper ends of said gores adapted so that the tapes 7:

are distributed along a circle centered on the longitudinal axis of the envelope 1 in the full state of the latter, are situated downwind from the cast-off point 8 when the balloon is launched.

As shown in FIG. 3, these tapes 7 are additionally provided with an eyelet 9 on the periphery of which they are provided with reinforcing films 10, designed to house a tie 11 for attaching the cylindrical envelope 2.

The assembly of gores 3, 4, tensioning tapes 5 and attachment tapes 7 are assembled by means of a conventional so-called overlap technique, shown in FIG. 2, consisting of:

overlapping the edges of the two gores 3, 4 interposing between the gores 3, 4 the assembly tape 7 made for example of 15 to 25 micron polyethylene, positioning on one of the gores 3 the tensioning tape 5 consisting for example of two Triplex (tradename) films between which polyester threads are inserted, positioning another Triplex 12 tape under the other gore 4, welding the assembly together.

Such an overlay assembly makes it possible to obtain, as shown in FIG. 3, when the gores 3, 4 are deployed, an envelope 1 within which the attachment tapes 7 float.

As regards the cylindrical envelope 2, this is open at each of its ends to enable the aerostatic gas to circulate and to improve convection exchanges. It is made of a material such as black, gold-coated, or aluminized polyester, and is suspended by the attachment ties 11 so as to be stretched out inside the envelope 1 without touching the latter.

It is additionally provided at the bottom part with an annular ballasting element 13 capable of ensuring that its shape is maintained.

As shown in FIG. 4, this cylindrical envelope 2 is first of all kept stretched by means of conventional throttle valves such as 14, which are opened by remote control or automatically.

In this way, and as shown in FIG. 5, it is only slightly deployed during the ascent phase and has very little influence on the rate of rise of the balloon.

FIG. 6 is a graph showing a simulation of the behaviour of a balloon according to the invention having a volume of 400,000 $m^3$, of which the sum of the solid masses is 1350 kg incorporating 500 kg of pay load, during a mission in November, namely in winter, above the arctic at a latitude of 65° north. These graphs were drawn up while assuming a rising infrared flux during the day of 220 $W/m^2$ and during the night of 170 $W/m^2$.

As can be noted on this graph, this balloon, by virtue of the fact that it fills with air while losing altitude during the night, as shown in FIG. 8, rises less high on the following night. Thus the balloon loses height from day to day and approaches in an asymptotic manner an equilibrium altitude of the order of 17 km obtained when air has completely replaced the aerostatic gas.

FIG. 7 shows changes in the vertical rates of movement of the balloon and illustrates very well how this balloon becomes stabilized, both during the day as well as during the night, at altitude stages after a relatively short period of ascent or descent.

As referred to above, FIG. 8 shows variations in the mass of inner gas enclosed inside the envelope 1 and brings out the large quantity of air scooped up by the balloon during its descent, which permits stabilization with a very low $\Delta T$ (temperature of the inner gas—temperature of the ambient air).

This $\Delta T$ is itself shown in FIG. 9 which demonstrates that, by virtue of the design of this balloon, the temperature of the inner gas, particularly at night, is largely sufficient, in relation to the temperature of the ambient air, to enable the balloon to be stabilized.

As regards FIGS. 10 and 11, these show changes in the temperature of the envelope 1 and of the internal screen 2 which, taking into account the place of the mission and the season in which this is carried out, are very much lower than the permissible temperatures for the constituent materials, but which perfectly illustrate the temperature gradients between said envelope and internal screen and the ambient air.

It should be noted that, although such a balloon is specifically intended for missions in the stratosphere, it is equally suitable for use in the troposphere as a machine for leisure purposes, instead and in place of current conventional hot air balloons of the burner type.

It has indeed been calculated that a balloon of this type with a volume of 3000 $m^3$ could support a pay load of 500 kg.

In this type of application however, the envelope 1 will preferably be made of a material reinforced with large-size meshes for safety reasons, the role of these meshes being to stop any tears that may occur so that such tears cannot interfere with the operation of the machine.

In addition, within the scope of this application, the balloon should be equipped with any means known per se enabling the active surface area of the internal screen 2 to be varied and ensuring the piloting of the machine.

I claim:

1. A stratospheric balloon wherein it comprises an outer flexible envelope (1) having a natural shape, namely with iso-stress, made of transparent synthetic material and having an air inlet opening capable of enabling the balloon to be maintained at constant volume, an internal screen (2) made of visible and infrared energy collecting material, and having the shape of a surface produced by a mobile generatrix parallel to the longitudinal axis of symmetry of the external envelope (1), said internal screen being connected to the envelope (1) by means of attachment (7, 11) disposed at the upper part of said envelope at a distance from the longitudinal axis of the latter, so as to extend longitudinally freely inside the envelope (1) without contacting it.

2. The stratospheric balloon as claimed in claim 1, wherein the outer flexible envelope (1) consists of gores (3, 4) assembled longitudinally by means of tensioning tapes (5) attached to the edges of these gores, said gores being interrupted at a distance from the lower pole of the envelope (1) so as to form the air inlet, and said tapes extending into the extension of said lower pole and being connected at the lower part to means for attaching a load (6).

3. The stratospheric balloon as claimed in claim 1, wherein the internal screen (2) includes a ballasted lower end able to ensure that the shape of said screen is maintained.

4. The stratospheric balloon as claimed in claim 1, wherein the means of attachment (7, 11) are disposed at a distance from the longitudinal axis of the envelope (1) adapted so that said means of attachment are situated downwind from the cast-off point (8) when the balloon is launched.

5. The stratospheric balloon as claimed in claim 2, wherein the gores (3, 4) are assembled by overlapping the edges of two gores and the tensioning tape (5), wherein the means of attachment of said balloon consist of tapes (7) interposed between the edges of the two gores (3, 4) when the latter are assembled, so that said tapes are caused to float inside the envelope (1) after said gores are deployed, and means (11) for attaching the internal screen (2) to each of the tapes (7).

6. Stratospheric balloon as claimed in claim 1, wherein the internal screen consists of a cylindrical envelope (2) open at its two ends.

7. The stratospheric balloon as claimed in claim 6, wherein, with a view to launching the said balloon, the cylindrical envelope (2) is held stretched, over its greatest length, by means of throttle valves (14) opened by remote control or automatically.

* * * * *